Oct. 21, 1969  JUN KIMURA ET AL  3,473,632
DEVICE FOR AUTOMATICALLY REGULATING THE LENGTH OF BRAKE
BAND IN BAND BRAKE
Filed June 10, 1968
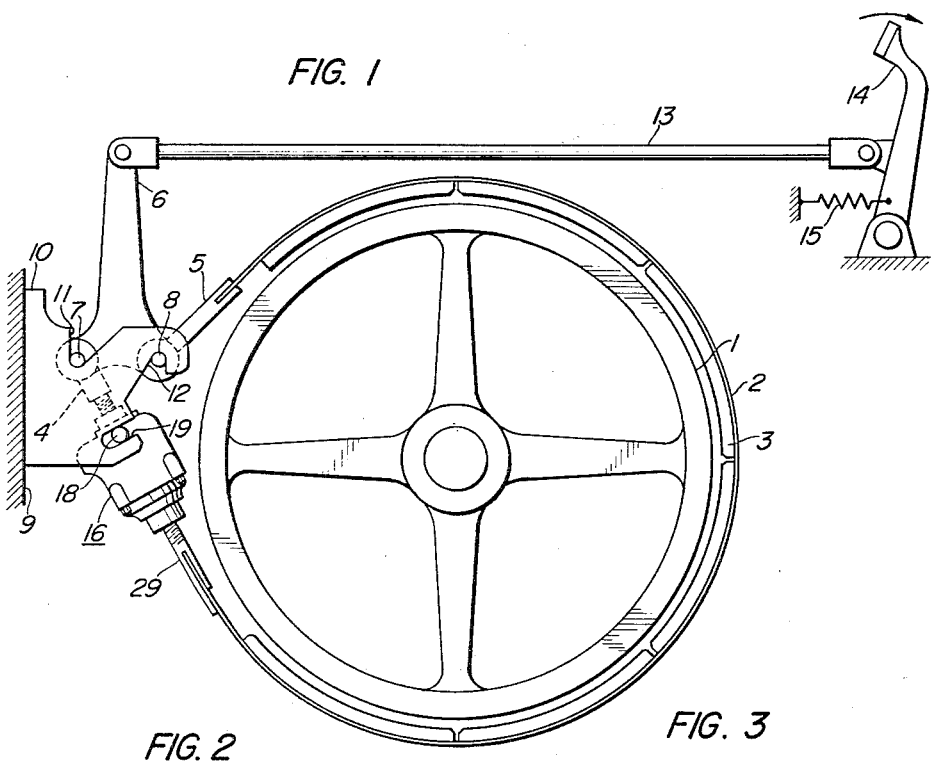
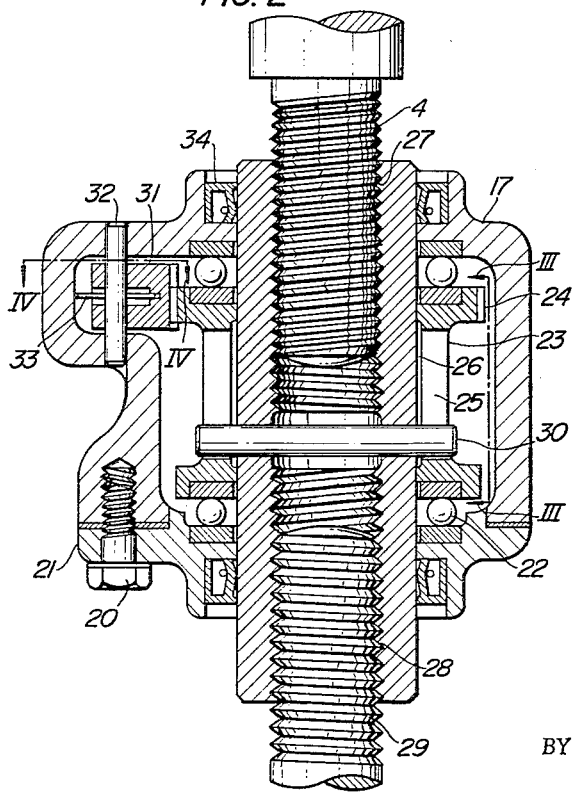
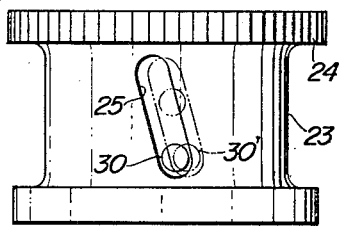
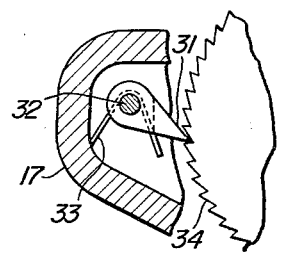
INVENTORS
JUN KIMURA
HIROSHI KUDOH
TOSHIMICHI IKEDA
BY Craig & Antonelli
ATTORNEYS United States Patent Office 3,473,632
Patented Oct. 21, 1969

3,473,632
DEVICE FOR AUTOMATICALLY REGULATING THE LENGTH OF BRAKE BAND IN BAND BRAKE
Jun Kimura, Matsudo-shi, and Hiroshi Kudoh and Toshimichi Ikeda, Tokyo, Japan, assignors to Hitachi, Ltd., Tokyo, Japan, a corporation of Japan
Filed June 10, 1968, Ser. No. 735,758
Int. Cl. F16d 49/10, 65/56
U.S. Cl. 188—77        4 Claims

ABSTRACT OF THE DISCLOSURE

A device for automatically regulating the length of the brake band in a band brake when the brake gap defined between the braked surface of the brake drum and the brake lining exceeds a predetermined limit in the course of brake actuation. The device maintains the brake gap at a predetermined value, improves the brake performance by constantly maintaining the amount of brake pedal depression within a predetermined range, and eliminates the troublesome maintenance work for the brake gap adjustment.

BACKGROUND OF THE INVENTION

This invention relates to band type brakes used in automotive vehicles, and more particularly to a device for incorporation in a brake of the above type for automatically regulating the length of the brake band thereby adjusting the brake gap defined between the lining on the brake band and the opposite braked surface of the brake drum so as to constantly maintain the brake gap at a predetermined appropriate setting.

Brakes of the band type represent one of the basic brake systems and are well known in the art. The brake of the band type is preferred because it has such advantages that it can easily be fabricated by virtue of simple construction, easily be mounted in proper position in brake equipment and does not occupy a large space for installation. Because of the above advantages, a band brake in which one end of the brake band is fixed so as to work as a stationary end while the other end of the brake band is movable so as to work as an operating end and the brake band is forced against the revolving drum surface by movement of the operating end relative to the stationary end, is frequently employed in the drive system of automotive vehicles and industrial trucks such as tractors. In the band brake with such a structure, wear taking place on the brake lining due to a long service results in an enlargement of the brake gap defined between the brake lining and the opposite braked surface of the brake drum, thus giving rise to an increase in the amount of brake pedal depression to stop or slow down the vehicle and a poor brake performance. Therefore, in the band brake of the structure described above, it is necessary to frequently check the brake gap between the brake lining and the opposite braked surface of the brake drum and to adjust the length of the brake band in order to constantly maintain the dimension of the brake gap between the brake lining and the braked surface of the brake drum at a predetermined appropriate value.

Conventional practice for the brake gap adjustment in the brake of this type has been such that a turnbuckle is additionally provided at the operating end of the brake band and is suitably turned by a spanner or the like to adjust the length of the brake band thereby to maintain the brake gap between the brake lining and the brake drum at the desired appropriate value.

Thus, the conventional method of adjusting the brake gap involves a troublesome maintenance operation of checking the brake gap at regular intervals and adjusting the brake gap to the predetermined setting.

SUMMARY OF THE INVENTION

It is therefore an object of the present invention to provide an automatic brake band regulating device for use with such a band brake in which means operative in response to brake actuation are provided in order to positively maintain the brake gap at the most desirable value regardless of the amount of wear of the brake lining and which can thus eliminate the need for incessant maintenance operation.

Another object of the present invention is to provide an automatic brake band regulating device which can constantly maintain the amount of brake actuation within a predetermined range thereby to prevent any increase in the amount of brake pedal depression resulting from the wear taking place on the brake lining and to improve the brake performance.

According to the present invention, there is provided, in a brake of the band type in which one end of a brake band substantially surrounding a brake drum is fixed and the other end thereof having a rod thereon is movably connected with a brake actuating rod, a device for automatically regulating the length of the brake band comprising a housing, a turnbuckle axially slidably disposed within said housing and connecting said rod on the movable end of said brake band to said brake actuating rod for adjusting the brake gap between said brake band and said brake drum, a rotary member disposed within said housing in coaxial relation with said turnbuckle and swingable back and forth in one direction and the other in response to reciprocating movement of said brake actuating rod in its axial direction, and a ratchet formed on said back-and-forth swingable rotary member in such a manner that said brake-gap adjusting turnbuckle can be rotated solely in one direction by being driven by said rotary member, the pitch of the teeth of said ratchet being so selected as to correspond to the allowable limit of the brake gap between said brake band and said brake drum.

The above and other objects, advantages and features of the present invention will be apparent from the following description with reference to the accompanying drawings.

BRIEF DESCRIPTION OF THE DRAWINGS

FIG. 1 is a front elevational view of a band brake equipped with the automatic brake band regulating device embodying the present invention.

FIG. 2 is an enlarged longitudinal sectional view of the device according to the present invention.

FIG. 3 is a side view of a rotary member in the device when viewed in a direction of the arrow III—III in FIG. 2.

FIG. 4 is a plan view of a ratchet (only partly shown) and a pawl in the device when viewed in a direction of the arrow IV—IV in FIG. 2.

DESCRIPTION OF THE PREFERRED EMBODIMENT

Referring to FIG. 1, a brake of the band type equipped with the device according to the present invention comprises a brake drum 1 having a braked surface, a brake band 2 extending along the braked surface of the brake drum 1, and a brake lining 3 firmly secured to the inner surface of the brake band 2. A brake actuating rod 4 and a fitting 5 are mounted on one end and on the other end of the brake band 2, respectively. The brake actuating rod 4 and the fitting 5 are pivoted to the lower end of a brake actuating lever 6 by respective pins 7 and 8. The pin 7 at the lower end of the brake actuating lever 6 engages a recess 1 formed in a bracket 10 secured to the chassis frame 9 of the vehicle, while the pin 8 engages a recess 12 of the same bracket 10. The brake actuating lever 6 is connected by a rod 13 with a brake actuating pedal 14. The brake actuating pedal 14 is normally urged to its non-operative position by a spring 15. When the brake actuating pedal 14 is depressed in a direction shown by the arrow in FIG. 1 so as thereby to cause clockwise rotation of the brake actuating lever 6 through the rod 13 about the pin 8 engaging with the recess 12 of the bracket 10, the brake actuating lever 6 applies tension to the brake band 2 through the actuating rod 4, with the result that the brake lining 3 is forced against the braked surface of the brake drum 1 to slow down or stop the rotation of the associated wheel.

The brake of the band type having the above structure, that is, the brake of the kind in which one end of the brake band 2 is fixed to serve as a stationary end while the other end of the brake band 2 is movable to serve as an operating end and the operating end of the brake band 2 is moved relative to the stationary end so as to apply brake to the brake drum 1 is already known in the art.

The present invention contemplates the provision of an automatic brake band regulating device for incorporation in such a brake. The device is disposed on the operating end side of the brake band 2 and includes means operative in response to brake actuation thereby to constantly maintain the brake gap between the brake lining 3 and the braked surface of the brake drum 1 at a predetermined appropriate value.

The automatic brake band regulating device according to the present invention has a structure as shown in FIG. 2. The device comprises a housing 17 which is mounted on the bracket 10 by means of a pin 18 which engages a recess 19 formed in the bracket 10 as seen in FIG. 1 so that the housing 17 can not move in the axial direction of the actuating rod 4 and can not rotate relative to the actuating rod 4. A rotary member 23 of generally cylindrical shape is disposed in the space defined between the housing 17 and a lower cover 21 secured to the housing 17 by bolts 20 and is rotatable within the space because it is supported by thrust bearings 22. The rotary member 23 is formed with a ratchet 24 on the outer peripheral surface of its upper end and with a pair of opposed slanting slots 25 in the middle portion thereof. A turnbuckle 26 for adjusting the brake gap between the brake band 2 and the brake drum 1 extends slidably through the cylindrical space within the rotary member 23 in coaxial relation therewith. The turnbuckle 26 is internally threaded at 27 and 28, and an externally threaded end of the actuating rod 4 is in threaded engagement with the internal thread 27, while an externally threaded end of a rod 29 connected to the operating end of the brake band 2 is in threaded engagement with the internal thread 28 of the turnbuckle 26. The device according to the present invention is so constructed that the rotary member 23 is rotated in the right-hand direction in FIG. 2 during the adjustment of the brake gap. Accordingly, the internal thread 27 of the turnbuckle 26 is threaded in the right-hand direction and the internal thread 28 of the turnbuckle 26 is threaded in the left-hand direction. It will be apparent that the actuating rod 4 in threaded engagement with the internal thread 27 and the rod 29 in threaded engagement with the internal thread 28 have the corresponding threads.

A pin 30 extends laterally outwardly from the outer periphery at the middle portion of the turnbuckle 26. As seen in FIG. 3, each of the pins 30 extending laterally outwardly from the turnbuckle 26 engages the corresponding slanting slot 25 in the rotary member 23 so that movement of the actuating rod 4 in its axial direction causes corresponding rotation of the rotary member 23 by being urged by the pin 30.

The ratchet 24 formed on the rotary member 23 is engaged by a pawl 31. A pin 32 press-fitted in the housing 17 carries the pawl 31 in a freely pivotal relationship as seen in FIG. 4 and a spring 33 normally forces the pawl 31 against the tooth surface of the ratchet 24.

Grease or lubricating oil is filled in the space within the housing 17 so as to lubricate the relatively rotating surfaces of the turnbuckle 26 and the rotary member 23 and to lubricate the thrust bearings 22. Oil seals 34 ensure a hermetic seal against leakage of the grease or oil filled within the housing 17.

Suppose now that the desired brake gap between the braked surface of the brake drum 1 and the brake lining 3 is $\delta$, then $S = 2\pi\delta$ is the required amount of pull to be imparted to the brake band 2 for effecting the brake action. The pitch of the teeth of the ratchet 24 is so selected that the pawl 31 engaging one tooth of the ratchet 24 overrides that tooth and engages the next tooth adjacent thereto when the actuating rod 4 is caused to move beyond the allowable limit which is $2\pi\delta$, where $\delta$ is the optimum brake gap.

The device according to the present invention having the structure described above operates in the following manner. Suppose that the braked surface of the brake drum 1 is spaced apart the optimum brake gap $\delta$ from the brake lining 3 in the released state of the brake, and the brake drum 1 is rotating in a clockwise direction in FIG. 1. Then, when the brake actuating pedal 14 is depressed to cause clockwise rotation of the brake actuating lever 6 through the rod 13 about the pin 8 engaging the recess 12 of the bracket 10, the brake actuating lever 6 pulls the brake band 2 through the actuating rod 4 by an amount of $2\pi\delta$ with the result that the brake lining 3 is forced against the braked surface of the brake drum 1 thereby imparting brake to the brake drum 1. In the course of the above operation, the turnbuckle 26 connected with the brake band 2, hence the pins 30 integral with the turnbuckle 26 are moved upwardly by an amount of $2\pi\delta$ relative to the rotary member 23 since the housing 17 supporting the rotary member 23 is locked in position fixed to the bracket 10 by means of the pin 18. Since the pins 30 engage the respective slanting slots 25 provided in the wall of the rotary member 23 as shown in FIG. 3, the upward movement of the turnbuckle 26 in the manner described above causes upward movement of the pins 30 along the slanting slots 25 from their original position in the lower end of the latter. As a result, the rotary member 23 is urged to rotate in a direction of the arrow shown in FIG. 3. In this case, however, the pawl 31 engaging one of the teeth of the ratchet 24 can not override such tooth to move over onto the next tooth because the amount of pull does not exceed $2\pi\delta$. When, therefore, the depression force applied to the brake actuating pedal 14 is released to release the brake applied to the brake drum 1, the turnbuckle 26 is forced downwardly by the brake actuating lever 6 and the pins 30 cause rotation of the rotary member 23 in a direction opposite to the above-described direction and return to their original position in the lower end of the slanting slots 25.

In case the brake lining 3 has considerably worn out to such an extent that the brake gap between the brake drum 1 and the brake lining 3 is now $\delta'$ which is larger than the allowable limit $\delta$, the amount of pull to be imparted to the brake band 2 for effecting the brake action becomes larger than $2\pi\delta$. In such a case, the relation between the pin 30 and the slanting slot 25 is such that the pin 30 moves further upwardly within the slot 25 to cause a greater rotation of the rotary member 23, and the ratchet 24 is rotated beyond one pitch of its teeth so that the pawl 31 engaging one of the teeth overrides such tooth to move over to engage the next tooth. Thus, the rotary member 23 is advanced by one pitch from the original position and is held in such an advanced position even after the force applied to the brake is released. In such position of the rotary member 23, the pin 30 is forcedly moved to a position 30′ in FIG. 3 by the brake actuating lever 6 which is normally urged away from the brake actuating position by the spring 15, and as a result, the turnbuckle 26 is rotated in the right-hand direction. Due to the right-hand rotation of the turnbuckle 26, the actuating rod 4 engaging the internal thread 27 and the rod 29 engaging the internal thread 28 of the turnbuckle 26 move inwardly into the turnbuckle 26 thereby to shorten the length of the brake band 2 and to maintain the brake gap between the braked surface of the brake drum 1 and the brake lining 3 at the predetermined desired value.

It will be appreciated from the foregoing description that the device according to the present invention is operative in response to brake actuation to adjust the length of the brake band 2 thereby constantly maintaining the brake gap between the braked surface of the brake drum and the brake lining at the desired value and continuously securing the amount of depression of the brake pedal at a constant value, and to ensure effective brake operation until the brake lining has substantially worn out, thereby eliminating the troublesome maintenance work for the brake gap adjustment. It will be further appreciated that the device according to the present invention is advantageous in that not only it has a small size and sturdy structure but also it can easily be mounted on and dismounted from a brake of the band type.

We claim:

1. In a brake of the band type in which one end of a brake band substantially surrounding a brake drum is fixed and the other end thereof having a rod thereon is movably connected with a brake actuating rod, a device for automatically regulating the length of the brake band comprising a housing, a turnbuckle axially slidably disposed within said housing and connecting said rod on the movable end of said brake band to said brake actuating rod for adjusting the brake gap between said brake band and said brake drum, a rotary member disposed within said housing in coaxial relation with said turnbuckle and rotatable back and forth in one direction and the other in response to reciprocating movement of said brake actuating rod in its axial direction, and a ratchet formed on said back-and-forth rotary member in such a manner that said brake-gap adjusting turnbuckle can be rotated solely in one direction by being driven by said rotary member, the pitch of the teeth of said ratchet being so selected as to correspond to the allowable limit of the brake gap between said brake band and said brake drum.

2. A device according to claim 1, in which a pin provided on said axially reciprocating turnbuckle engages a slanting slot provided in the wall of said rotary member having said ratchet so as to cause the rotation of said rotary member back and forth in one direction and the other.

3. A device according to claim 1, in which a pawl provided within said housing engages said ratchet formed on said rotary member so as to hold said rotary member in a one-pitch advanced position when said rotary member is rotated beyond one pitch of the teeth of said ratchet.

4. A device according to claim 1, in which lubricating oil is filled within said housing containing therein said turnbuckle, and said rotary member having said ratchet.

References Cited

UNITED STATES PATENTS 2,096,463 10/1937 Moody.
2,291,816 8/1942 Lear _____ 188—77

FOREIGN PATENTS 836,462 6/1960 Great Britain.

OTHER REFERENCES

German printed application, 1,039,855, September 1958, Seiler et al.

GEORGE E. A. HALVOSA, Primary Examiner

U.S. Cl. X.R.

188—79.5, 196; 192—80, 111